United States Patent
Maekawa et al.

(10) Patent No.: US 7,647,034 B2
(45) Date of Patent: Jan. 12, 2010

(54) DESIGN SUPPORT SYSTEM AND DESIGN METHOD FOR CIRCUIT BOARD, AND NOISE ANALYSIS PROGRAM

(75) Inventors: Tomoya Maekawa, Nara (JP); Toru Yamada, Osaka (JP); Tetsuyoshi Ogura, Osaka (JP)

(73) Assignee: Panasonic Corporation, Osaka (JP)

( * ) Notice: Subject to any disclaimer, the term of this patent is extended or adjusted under 35 U.S.C. 154(b) by 700 days.

(21) Appl. No.: 11/513,267

(22) Filed: Aug. 31, 2006

(65) Prior Publication Data
US 2007/0079272 A1 Apr. 5, 2007

(30) Foreign Application Priority Data
Sep. 2, 2005 (JP) ............................ 2005-254806

(51) Int. Cl.
*H04B 1/10* (2006.01)
(52) U.S. Cl. ................... 455/296; 455/63.1; 455/67.13; 455/114.2
(58) Field of Classification Search ................. 455/296, 455/63.1, 67.13, 114.2, 67.11, 115.1, 222, 455/226.1, 226.3
See application file for complete search history.

(56) References Cited
U.S. PATENT DOCUMENTS 5,674,265 A * 10/1997 Deschamps et al. ........... 607/60
6,785,381 B2 * 8/2004 Gartner et al. .......... 379/392.01
6,978,159 B2 * 12/2005 Feng et al. .................... 455/570
2003/0224767 A1 * 12/2003 Futamase et al. .......... 455/414.1
2009/0192777 A1 * 7/2009 Clement et al. ............... 703/16
2009/0195701 A1 * 8/2009 Fujishima et al. ............ 348/729

FOREIGN PATENT DOCUMENTS

JP 2000-206163 7/2000
JP 2002-73716 3/2002

* cited by examiner

*Primary Examiner*—Pablo N Tran
(74) *Attorney, Agent, or Firm*—Wenderoth, Lind & Ponack, L.L.P.

(57) ABSTRACT

A design support system for circuit board includes: a noise source extracting unit for extracting a source of unwanted radiation noise which is generated from a circuit board mounted on an electronic equipment; a noise characteristics input unit for inputting noise characteristics of the unwanted radiation noise which is emitted by the extracted noise source; a noise attenuation ratio input unit for inputting an attenuation ratio of the unwanted radiation noise which is emitted by the noise source and propagated to a feed point of an antenna; a correlation value calculation unit for calculating a correlation value between the noise characteristics and the attenuation ratio of the unwanted radiation noise; and a comparator unit for comparing the calculated correlation value with a predetermined allowable value, whereby avoiding malfunction of an electronic equipment due to interference of unwanted radiation noises generated from the particular electronic equipment into the circuit board via the antenna.

19 Claims, 10 Drawing Sheets

AMPLITUDE:
4.76V

FREQUENCY:
13.96 MHz

RISE TIME:
1.500 ns

Fig. 13A
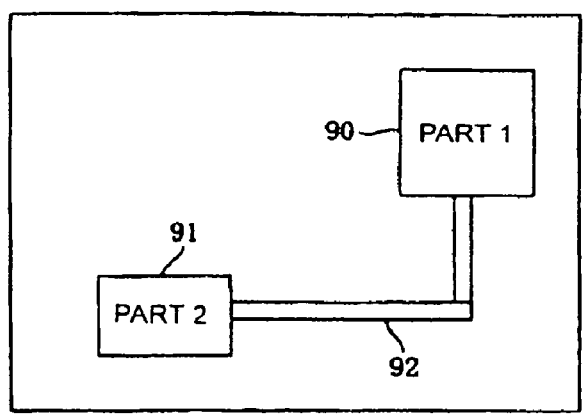
Fig. 13B
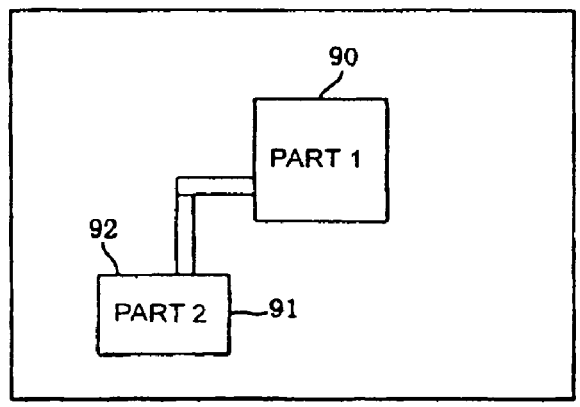
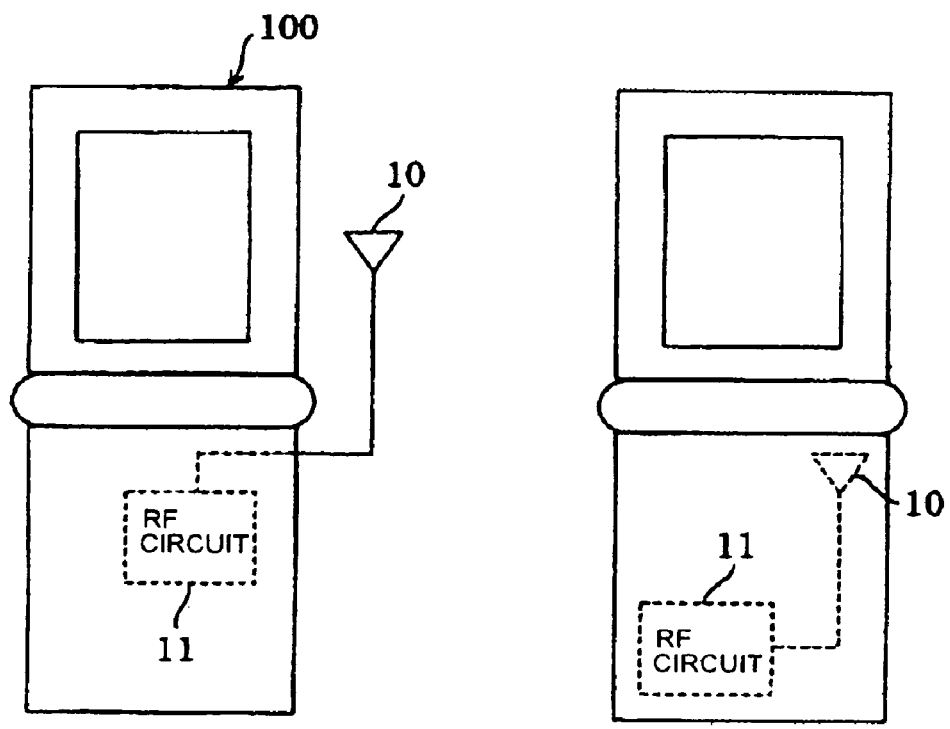
Fig. 14A          Fig. 14B

DESIGN SUPPORT SYSTEM AND DESIGN METHOD FOR CIRCUIT BOARD, AND NOISE ANALYSIS PROGRAM

BACKGROUND OF THE INVENTION

1. Field of the Invention

The present invention relates to a design support system and a design method for circuit board of an electronic equipment which can transmit and receive electro-magnetic waves via an antenna, and to a noise analysis program.

2. Description of the Related Art

As multifunctional and high-speed electronic equipments, such as cellular phone, have been developed in recent years, unwanted radiation noises radiated from the electronic equipments may cause electro-magnetic interference (EMI) which can affect operations of other electronic equipments, hence, magnitude of the unwanted radiation noise is limited by law.

Electronic equipment manufacturers take EMI measures to estimate unwanted radiation noises externally radiated from electronic equipments prior to commercial production and to suppress generation of the unwanted radiation noises so as to obey regulatory values.

However, conventional measurement of unwanted radiation noises is far-field electro-magnetic measurement in which a measurement point is located far away from an electronic equipment. The primary purpose thereof is to inspect whether or not the unwanted radiation noises from the whole electronic equipment obey the regulatory values.

If unwanted radiation noises are estimated in order to take EMI measures after electronic parts and wiring of circuit boards constituting an electronic equipment have been fixed, arrangement of the electronic parts and the wiring must be totally redesigned, thereby resulting in a large amount of time and effort for taking EMI measures.

In a case where we can estimate electro-magnetic intensity in the vicinity of a circuit board constituting an electronic equipment, we can identify sources of unwanted radiation noises, thereby effectively taking EMI measures. The following patent document 1 discloses such a method for near-field electro-magnetic measurement.

The related prior art is listed as follows: Japanese Patent Unexamined Publication (koukai) JP-2000-206163, A.

The near-field electro-magnetic measurement has an advantage of identifying sources of unwanted radiation noises for effectively taking EMI measures. But the measurement is effective only in EMI affecting operation of another electronic equipment.

Meanwhile, in modern electronic equipments having communication function, such as cellular phone, actualized is a different type of noise problem in which a slight unwanted radiation noise generated from the particular electronic equipment may be picked up by a highly-sensitive antenna thereof, causing the electronic equipment to malfunction.

In general, for EMI measures, it is effective to shield chassis or circuit boards of electronic equipments. But a recent cellular phone has a part of a circuit board which can operate as an antenna. In this case, the above-described type of noise problem cannot be overcome by the conventional shielding.

Particularly, recent cellular phones are equipped with camera function and movie transmitting and receiving function, as well as the communication function. The above-described type of noise may adversely affect image characteristics as well as reception characteristics.

Thus, the conventional design support system and the conventional design method for circuit board take no account of such a problem as malfunction of an electronic equipment caused by interference of unwanted radiation noises generated from the particular electronic equipment into the circuit board via the antenna.

SUMMARY OF THE INVENTION

In light of these problems, it is an object of the present invention to provide a design support system and a design method for circuit board, which can avoid such a problem as malfunction of an electronic equipment due to interference of unwanted radiation noises generated from the particular electronic equipment into the circuit board via the antenna, and can attain an effective design of electronic parts and wiring.

A design support system for circuit board of an electronic equipment which can transmit and receive electro-magnetic waves via an antenna, according to the present invention, includes:

a noise source extracting unit for extracting a source of unwanted radiation noise which is generated from the circuit board mounted on the electronic equipment;

a noise characteristics input unit for inputting noise characteristics of the unwanted radiation noise which is emitted by the extracted noise source;

a noise attenuation ratio input unit for inputting an attenuation ratio of the unwanted radiation noise which is emitted by the noise source and propagated to a feed point of the antenna;

a correlation value calculation unit for calculating a correlation value between the noise characteristics and the attenuation ratio of the unwanted radiation noise; and a comparator unit for comparing the calculated correlation value with a predetermined allowable value.

In a preferred embodiment, the system further includes a disincentive identifying unit for identifying, based on the comparative result between the correlation value calculated by the correlation value calculation unit and the predetermined allowable value, a disincentive source which may cause the electronic equipment to malfunction due to interference of the unwanted radiation noise into the circuit board via the antenna.

In another preferred embodiment, said disincentive identifying unit identifies a disincentive source which may disable reception characteristics of a receiver circuit on the circuit board due to interference of the unwanted radiation noise into the receiver circuit via the antenna.

It is preferable that said feed point of the antenna is defined as an impedance matching point between the antenna and the receiver circuit.

In a preferred embodiment, the noise characteristics include a radiation spectrum of the unwanted radiation noise.

In another preferred embodiment, the antenna is formed of a part of the circuit board.

In yet another preferred embodiment, the system further includes a structure modifying unit for modifying structure of the circuit board in which the source identified by the disincentive identifying unit resides, until the correlation value becomes equal to or smaller than the predetermined allowable value.

In still yet another preferred embodiment, modification of structure of the circuit board includes modification of either mounting position of electronic parts or a wiring pattern.

In still yet another preferred embodiment, the system further includes:

a design data unit in which design data of the circuit board are stored; and a noise characteristics calculation unit for calculating noise characteristics of the unwanted radiation noise using simulation, based on the design data stored in the design data unit.

In still yet another preferred embodiment, the system further includes:

a design data unit in which design data of the circuit board are stored; and a noise attenuation ratio calculation unit for calculating the attenuation ratio of the unwanted radiation noise which is propagated to the feed point of the antenna, based on the design data stored in the design data unit.

In still yet another preferred embodiment, the system further includes:

an antenna characteristics input unit for inputting antenna characteristics of the antenna, wherein the correlation value calculation unit calculates the noise characteristics and the attenuation ratio of the unwanted radiation noise, and a correlation value of the antenna characteristics.

A design method for circuit board of an electronic equipment which can transmit and receive electro-magnetic waves via an antenna, according to the present invention, includes:

a first step for extracting a source of unwanted radiation noise which is generated from the circuit board mounted on the electronic equipment;

a second step for acquiring noise characteristics of the unwanted radiation noise which is emitted by the extracted noise source;

a third step for acquiring an attenuation ratio of the unwanted radiation noise which is emitted by the noise source and propagated to a feed point of the antenna;

a fourth step for calculating a correlation value between the noise characteristics and the attenuation ratio of the unwanted radiation noise; and a fifth step unit for identifying, based on a comparative result between the calculated correlation value and a predetermined allowable value, a disincentive source which may cause the electronic equipment to malfunction due to interference of the unwanted radiation noise into the circuit board via the antenna.

In a preferred embodiment, the fifth step identifies a disincentive source which may disable reception characteristics of a receiver circuit on the circuit board due to interference of the unwanted radiation noise into the receiver circuit via the antenna.

In another preferred embodiment, the noise characteristics include a radiation spectrum of the unwanted radiation noise.

In yet another preferred embodiment, the method further includes a sixth step for modifying structure of the circuit board in which the identified source resides, until the correlation value becomes equal to or smaller than the predetermined allowable value.

In still yet another preferred embodiment, the sixth step modifies either mounting position of electronic parts or a wiring pattern, until the correlation value becomes equal to or smaller than the predetermined allowable value.

A noise analysis program for unwanted radiation noises of an electronic equipment which can transmit and receive electro-magnetic waves via an antenna, according to the present invention, includes:

a first step for extracting a source of unwanted radiation noise which is generated from a circuit board mounted on the electronic equipment;

a second step for acquiring noise characteristics of the unwanted radiation noise which is emitted by the extracted noise source;

a third step for acquiring an attenuation ratio of the unwanted radiation noise which is emitted by the noise source and propagated to a feed point of the antenna;

a fourth step for calculating a correlation value between the noise characteristics and the attenuation ratio of the unwanted radiation noise; and a fifth step unit for identifying, based on a comparative result between the calculated correlation value and the predetermined allowable value, a disincentive source which may cause the electronic equipment to malfunction due to interference of the unwanted radiation noise into the circuit board via the antenna.

In a preferred embodiment, the fifth step identifies a disincentive source which may disable reception characteristics of a receiver circuit on the circuit board due to interference of the unwanted radiation noise into the receiver circuit via the antenna.

In another preferred embodiment, the noise characteristics include a radiation spectrum of the unwanted radiation noise.

According to the present invention, by calculating the correlation value between the noise characteristics of the unwanted radiation noise and the attenuation ratio of the unwanted radiation noise propagated to a feed point of the antenna, it is easy to identify a disincentive source which may cause the electronic equipment to malfunction due to interference of the unwanted radiation noise into the circuit board via the antenna. Hence, effective measures against the unwanted radiation noise can be taken in a design phase of the circuit board.

BRIEF DESCRIPTION OF THE DRAWINGS

FIGS. 13A and 13B are explanatory views showing a case where measures are taken against unwanted radiation noise, according to the present invention.

FIGS. 14A and 14B are schematic views showing an antenna and an RF circuit (receiver circuit) in a cellular phone.

DETAILED DESCRIPTION OF THE PREFERRED EMBODIMENTS

This application is based on an application No. 2005-254806 filed on Sep. 2, 2005 in Japan, the disclosure of which is incorporated herein by reference.

Hereinafter, preferred embodiments will be described with reference to drawings.

Figure 1:
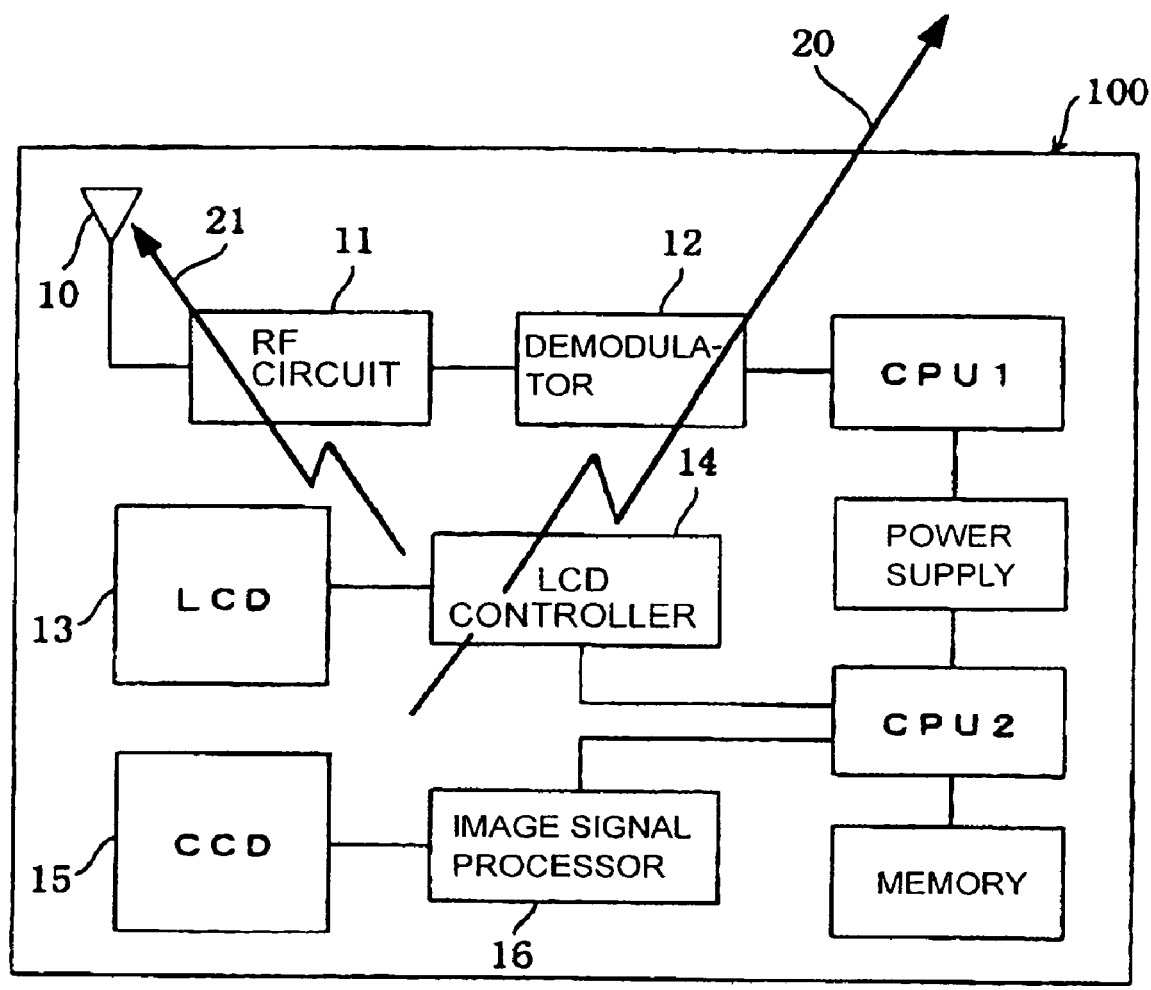
FIG. 1 is a block diagram showing a basic configuration of a cellular phone.

FIG. 1 is a block diagram showing a basic configuration of a cellular phone 100, in which provided are a communication function mainly including an RF (Radio Frequency) circuit 11, which is connected to a highly-sensitive antenna 10, and a demodulator circuit 12 (receiver circuit), and a display function including a liquid crystal panel (LCD) 13 and a LCD controller 14, and a camera function including an imaging device (CCD) 15 and an image signal processing circuit 16.

Electronic parts constituting the above-mentioned circuits are mounted on a circuit board and connected to each other via a wiring pattern formed on the circuit board. Arrangement of these electronic parts and the wiring pattern are generally designed using a CAD (Computer Aided Design) system.

As described in paragraphs of Background, unwanted radiation noises emitted from the circuit board are classified to a noise 20 which is radiated externally out of the cellular phone 100 and to a noise 21 which is picked up by the antenna 10. The latter type of noise 21 cannot be shut out even by shielding a chassis of the cellular phone 100. Interference of the noise 21 via the antenna 10 into the RF circuit 11 may degrade reception characteristics thereof.

The present inventors have completed the present invention after detailed discussion on a method for easily identifying a disincentive source which may cause the electronic equipment to malfunction, in a design phase of the circuit board.

An embodiment according to the present invention will be described below with reference to drawings. For simplicity of description, elements having substantially the same function are denoted by the same numeral. Incidentally, the present invention is not limited to the following embodiment.

Embodiment 1

Figure 2:
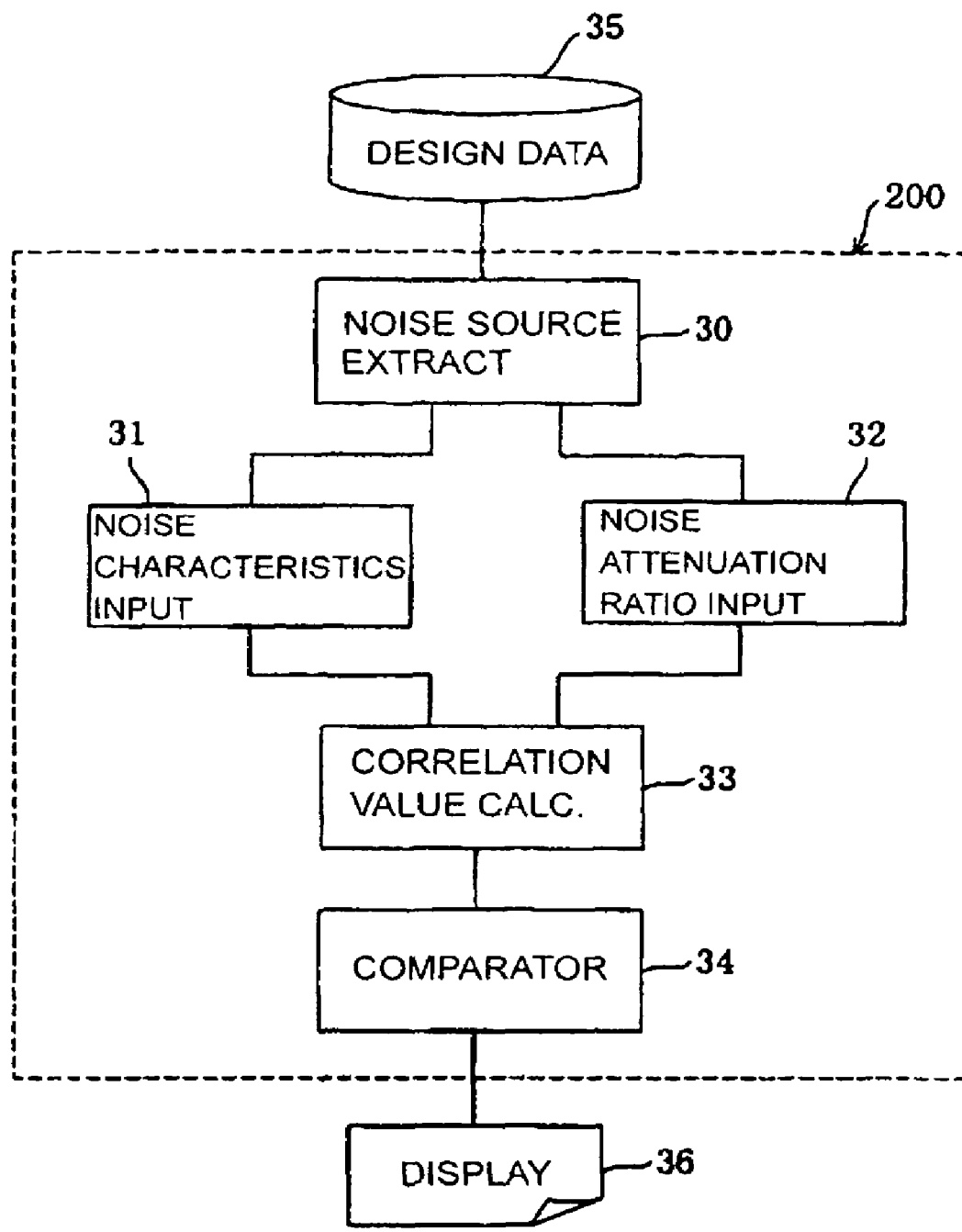
FIG. 2 is a block diagram showing a basic configuration of a design support system for circuit board, according to Embodiment 1 of the present invention.

FIG. 2 is a block diagram showing a basic configuration of a design support system 200 for circuit board, according to Embodiment 1 of the present invention.

In the design support system 200 for circuit board, shown in FIG. 2, a noise source extracting unit 30 extracts a source of unwanted radiation noise which is generated from the circuit board mounted on the electronic equipment, which can transmit and receive electro-magnetic waves via the antenna. The source of unwanted radiation noise can be extracted based on design data 35 of the circuit board, in which arrangement of the electronic parts and the wiring pattern are stored.

A site in which a source of unwanted radiation noise easily resides is empirically known, for example, in circuitry, power switching circuit or high frequency circuit easily constitutes the noise source, and in wiring layout, power supply lines or high frequency signal lines easily constitute the noise source.

A noise characteristics input unit 31 is inputted with noise characteristics of the unwanted radiation noise, which is emitted from the noise source extracted by the noise source extracting unit 30. A noise attenuation ratio input unit 32 is inputted with an attenuation ratio (isolation) of the unwanted radiation noise, which is emitted by the noise source extracted by the noise source extracting unit 30 and propagated to a feed point of the antenna.

A correlation value calculation unit 33 calculates a correlation value between the noise characteristics of the unwanted radiation noise which is inputted in the noise characteristics input unit 31 and the attenuation ratio of the unwanted radiation noise which is inputted in the noise attenuation ratio input unit 32. The correlation value indicates how much interference of the unwanted radiation noise emitted from the noise source into the circuit board via the antenna has an influence on the function of the electronic equipment.

The correlation value can be calculated per position of the noise source using an equation expressing correlativity between noise characteristics and a noise attenuation ratio. For example, a correlation value $A(x, y, z)$ at a position $(x, y, z)$ of a noise source can be calculated by the following equation (1).

$$A(x, y, z) = ka^2 + ma \cdot b + nb^2 \quad (1)$$

wherein k, m and n are constants, a is noise characteristics, b is a noise attenuation ratio.

We can simplify the equation (1) to calculate the correlation value A using the following equation (2).

$$A(x, y, z) = ma \cdot b \quad (2)$$

wherein m is a constant, a is noise characteristics, b is a noise attenuation ratio. Preferably, k, m and n are set to appropriate values as needed, by taking account of an allowable value described below.

A comparator unit 34 compares the correlation value calculated by the correlation value calculation unit 33 with a predetermined allowable value. The allowable value can be optionally set to a value within a range that has no influence on the function of the electronic equipment due to interference of the unwanted radiation noise into the circuit board via the antenna. For example, in a W-CDMA based cellular phone, a standard value, which has been standardized so as not to affect transmission and reception by 3GPP (3rd Generation Partnership Project), may be employed.

The comparative result of the comparator unit 34 can be indicated on a display unit 36, such as display panel, thereby recognizing whether or not the correlation value of the noise source extracted by the noise source extracting unit 30 exceeds the allowable value.

In a case of the correlation value exceeding the allowable value, we can predict that the function of the electronic equipment will be affected due to interference of the unwanted radiation noise emitted from the particular noise source into the circuit board via the antenna. Thus, we can decide on necessity of modify the structure of the circuit board in which the noise source resides, e.g., the mounting position of electronic parts and/or the wiring pattern.

Next, referring to FIGS. 3 to 5, an example of calculating a correlation value A for a noise source will be described below.

Figure 3:
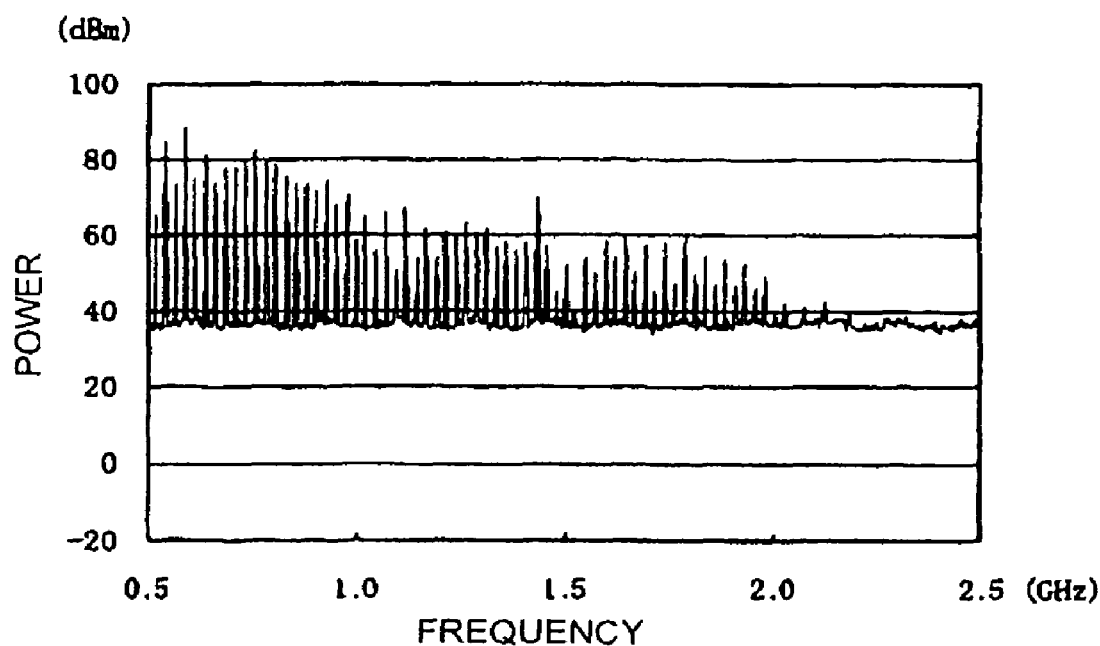
FIG. 3 is a radiation spectrum showing noise characteristics of unwanted radiation noise emitted from a noise source.

FIG. 3 is a radiation spectrum, measured by a spectrum analyzer, showing noise characteristics of unwanted radiation noise emitted from a noise source.

Figure 4:
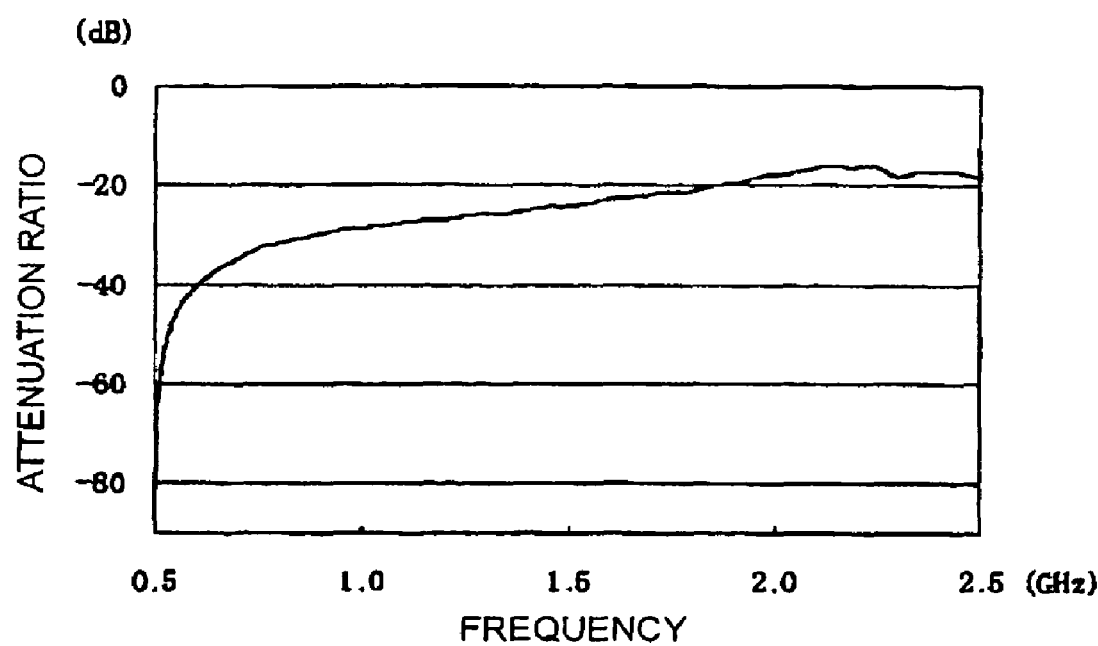
FIG. 4 is a graph showing an attenuation ratio of unwanted radiation noise which is emitted from a noise source and propagated to a feed point of an antenna.

FIG. 4 is a graph showing an attenuation ratio of the unwanted radiation noise which is emitted from the noise source and propagated to a feed point of an antenna. Incidentally, measurement of the attenuation ratio and the reason why the attenuation ratio during propagation to a feed point of an antenna should be measured will be described later.

Figure 5:
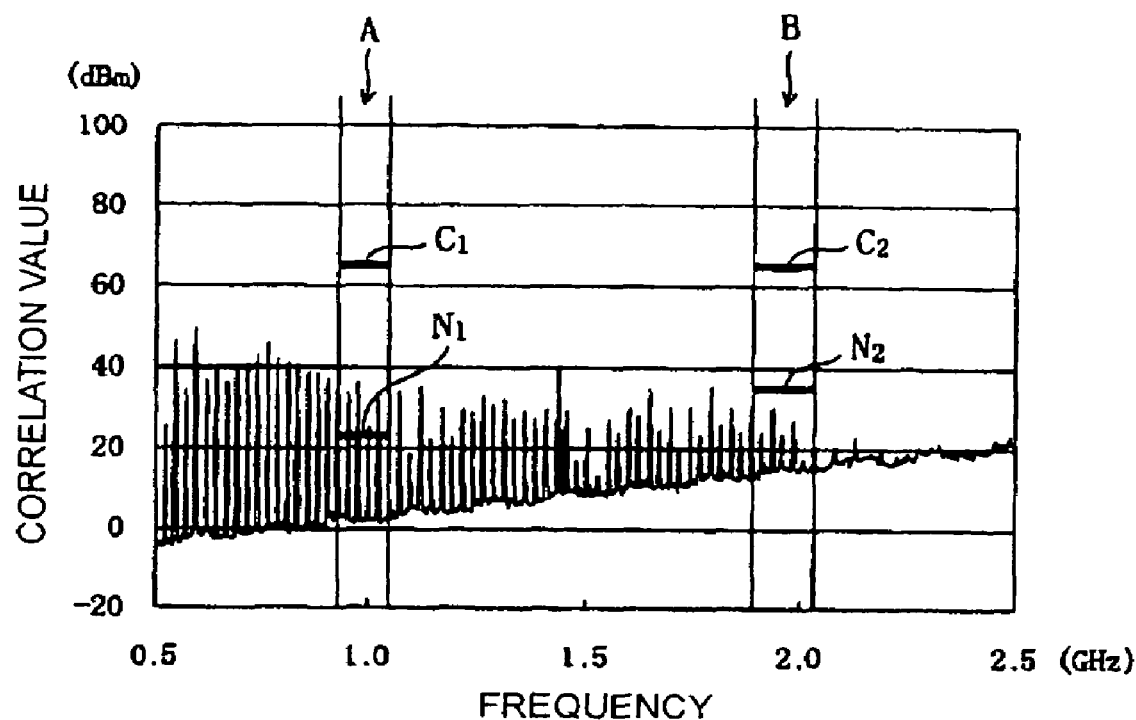
FIG. 5 is a graph showing a correlation value between the radiation spectrum of the unwanted radiation noise and the attenuation ratio of the unwanted radiation noise.

FIG. 5 is a graph showing the result of calculating the correlation value between the radiation spectrum of the unwanted radiation noise (noise characteristics), shown in FIG. 3, and the attenuation ratio of the unwanted radiation noise, shown in FIG. 4, in which the spectrum exhibits the calculated correlation value.

FIG. 5 shows relation between C/N (carrier to noise ratio) and the calculated correlation value. The C/N is calculated based on each of a frequency band A (center frequency: 1 GHz) and another frequency band B (center frequency: 2 GHz) in each level diagram of electro-magnetic waves transmitted and received via each antenna of different electronic equipments.

As shown in FIG. 5, in the electronic equipment having the frequency band A, the magnitude of the correlation value (spectrum) exceeds the level of the noise N1. Hence, the noise source can be identified as a disincentive source which may cause the electronic equipment to malfunction due to interference of the unwanted radiation noise into the circuit board via the antenna.

Meanwhile, in the electronic equipment having the frequency band B, the magnitude of the correlation value (spectrum) is equal to or smaller than the level of the noise N2. Hence, we can decide that the noise source is not a disincentive source to the function of the electronic equipment.

For the noise characteristics of unwanted radiation noise, FIG. 3 shows the radiation spectrum of the unwanted radiation noise. Alternatively, in another case where a wiring pattern is extracted as a noise source, high frequency components of a current flowing through the wiring can be employed for the noise characteristics of unwanted radiation noise.

Figure 6:
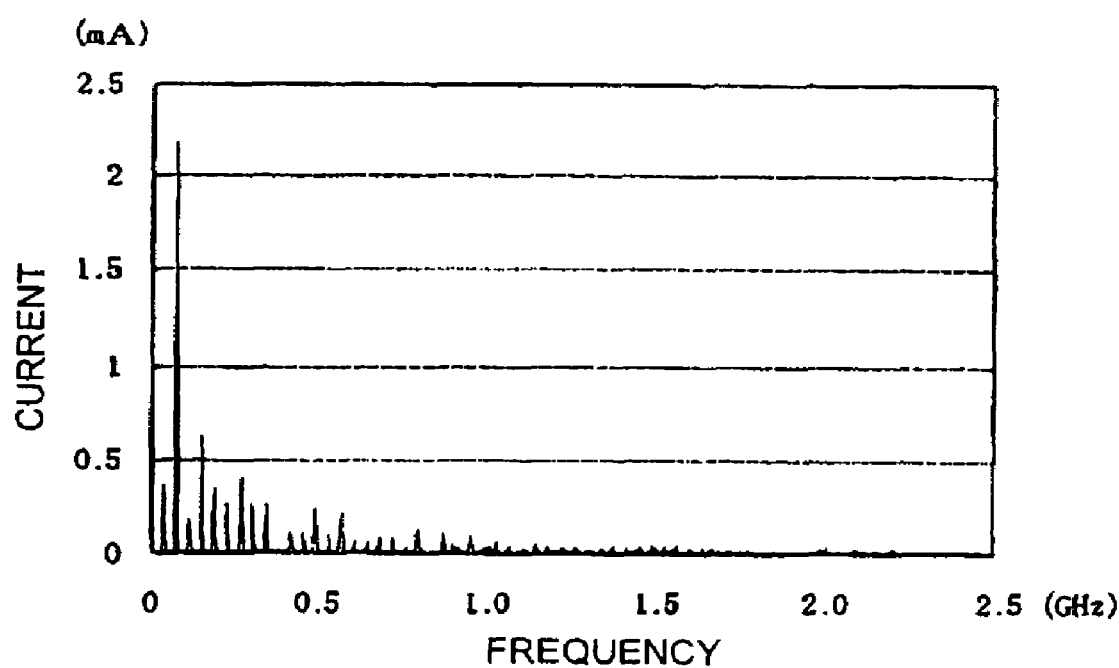
FIG. 6 is a graph showing high frequency components of a current flowing through a wiring pattern constituting a noise source.

FIG. 6 is a graph showing high frequency components of a current flowing through a wiring pattern constituting a noise source. The correlation value between the noise characteristics and the attenuation ratio of the unwanted radiation noise can be calculated based on both of the high frequency components of the current, shown in FIG. 6, and the noise attenuation ratio, shown in FIG. 4.

Figure 7:
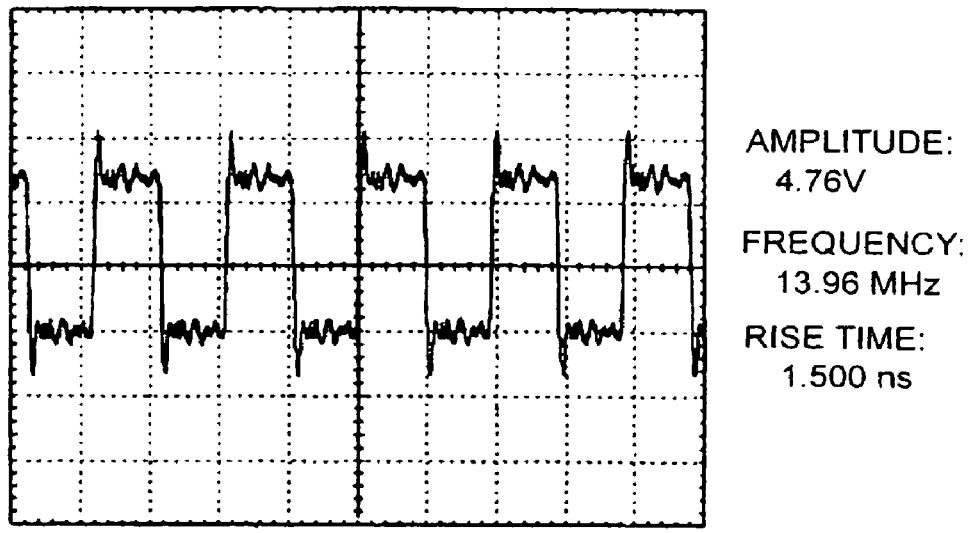
FIG. 7 is a graph showing a clock waveform (temporal waveform) exhibiting noise characteristics of the unwanted radiation noise.

In addition, the noise characteristics of the unwanted radiation noise can be also calculated based on a clock waveform (temporal waveform) as shown in FIG. 7. Namely, the correlation value can be calculated based on both of a spectrum which is obtained using fast Fourier transform of the measured waveform data (amplitude, frequency and rise time) and the noise attenuation ratio, shown in FIG. 4.

Figure 8:
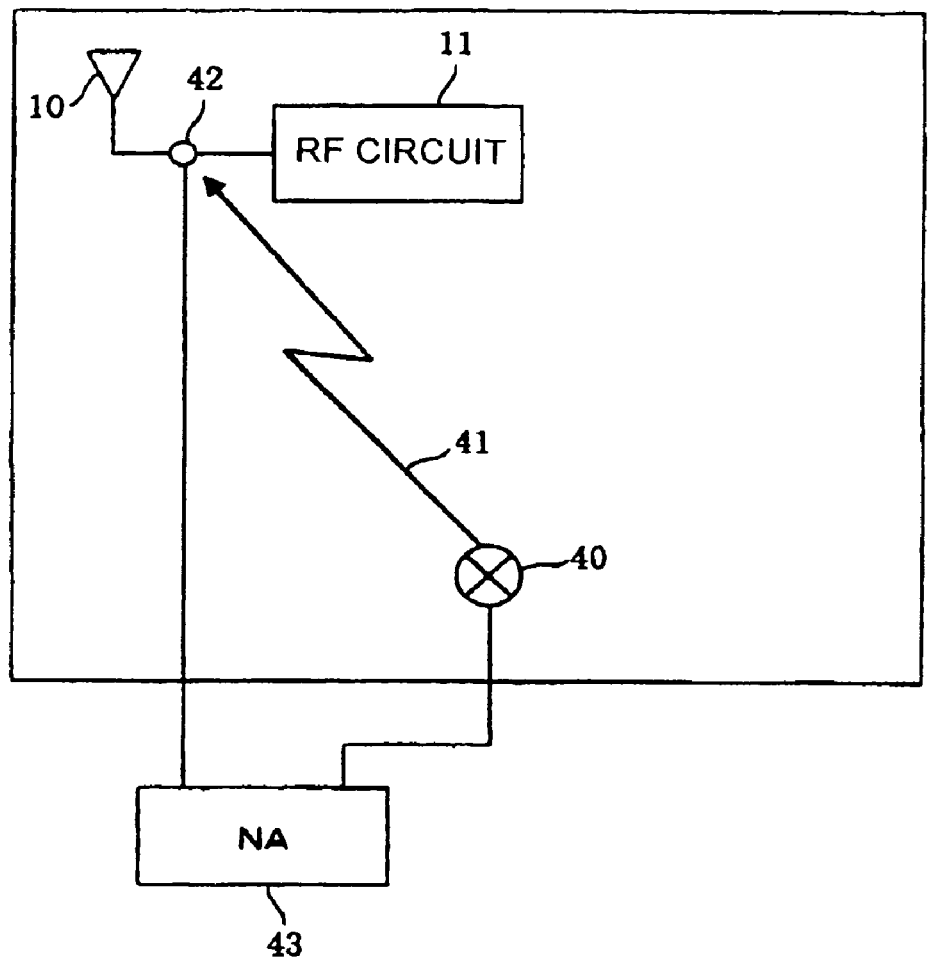
FIG. 8 is a diagram showing a method for measurement of the attenuation ratio of the unwanted radiation noise.

Next, referring to FIG. 8, a method for measurement of the attenuation ratio of unwanted radiation noise will be described below. As shown in FIG. 8, we now assume a case of interference of an unwanted radiation noise 41 from a noise source 40, which is extracted in the circuit board constituting the cellular phone (electronic equipment) 100, via a feed point 42 of the antenna 10 into the RF circuit (receiver circuit) 11. The feed point 42 of the antenna 10 is defined as an impedance matching point between the antenna 10 and the RF circuit 11.

The measurement is performed using 2-port measurement, in which ports of a network analyzer 43 are the noise source 40 and the feed point 42 of the antenna 10, respectively, so as to measure the attenuation ratio of the unwanted radiation noise 41 which is emitted from the noise source 40 and propagated to the feed point 42 of the antenna 10.

Incidentally, the reason why a measurement point of the attenuation ratio of the unwanted radiation noise is set at the feed point of the antenna, i.e., the impedance matching point between the antenna 10 and the RF circuit 11, will be described as follows.

Since the C/N (carrier to noise ratio), which is calculated based on the level diagram, is defined with a reference of the feed point 42 of the antenna 10, it is most preferable that the correlation value to compare with the C/N is also calculated based on the attenuation ratio of the unwanted radiation noise, originating from the measurement point of the feed point 42 of the antenna 10.

Further, the feed point 42 of the antenna 10 is also identical to an input point of the RF circuit (receiver circuit) 11. Therefore, by calculating the correlation value at the input point and comparing it with the C/N, it is most effective to identify a disincentive source which may cause the electronic equipment to malfunction.

Figure 9:
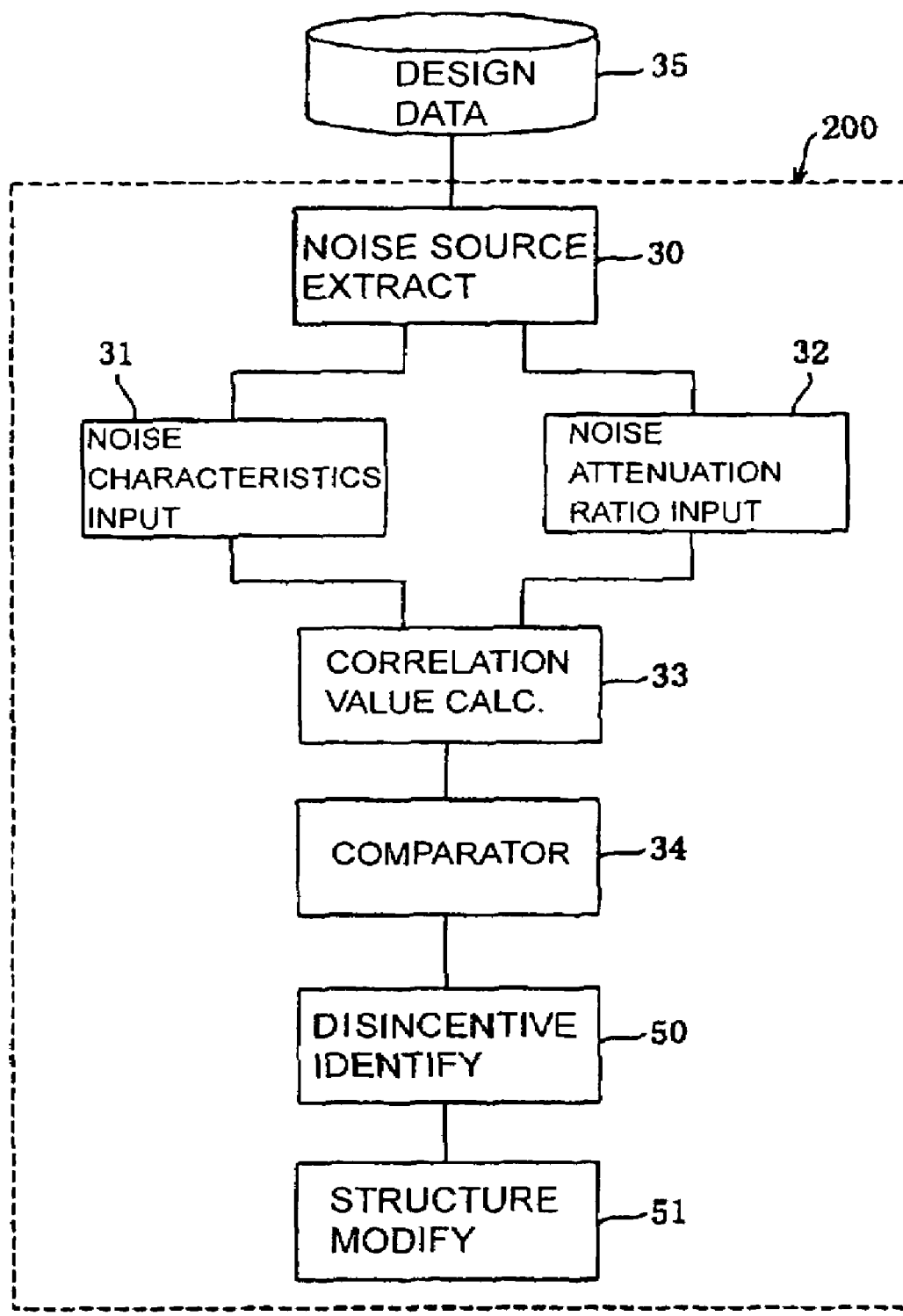
FIG. 9 is a block diagram showing another configuration of a design support system for circuit board, according to the present invention.

FIG. 9 is a block diagram showing another configuration of the design support system 200 for circuit board, as shown in FIG. 2, further including a disincentive identifying unit 50 and a structure modifying unit 51, in order to more effectively take measures against unwanted radiation noise by identifying a disincentive source which may cause the electronic equipment to malfunction.

The disincentive identifying unit 50 identifies, based on the comparative result between the correlation value calculated by the correlation value calculation unit 33 and the predetermined allowable value, a disincentive source which may cause the electronic equipment to malfunction due to interference of the unwanted radiation noise into the circuit board via the antenna.

The structure modifying unit 51 modifies structure of the circuit board in which the source identified by the disincentive identifying unit 50 resides, until the correlation value becomes equal to or smaller than the predetermined allowable value, thereby, in a design phase of the circuit board, avoiding such a problem as malfunction of the electronic equipment due to interference of unwanted radiation noises generated from the particular electronic equipment into the circuit board via the antenna.

When modifying structure of the circuit board, such various measures can be taken to suppress EMI, as modification of mounting positions of electronic parts and/or modification of layout of the wiring pattern, as well as insertion of EMI parts, such as noise filter, and/or insertion of a shielding layer between layers of a multi-layer board.

In the design support system 200 for circuit board, as shown in FIG. 2, the noise characteristics input unit 31 and the noise attenuation ratio input unit 32 are inputted with the noise characteristics and the attenuation ratio which are actually measured by an instrument, respectively. Alternatively, the noise characteristics and the attenuation ratio may be calculated using simulation based on the design data of the circuit board.

Figure 10:
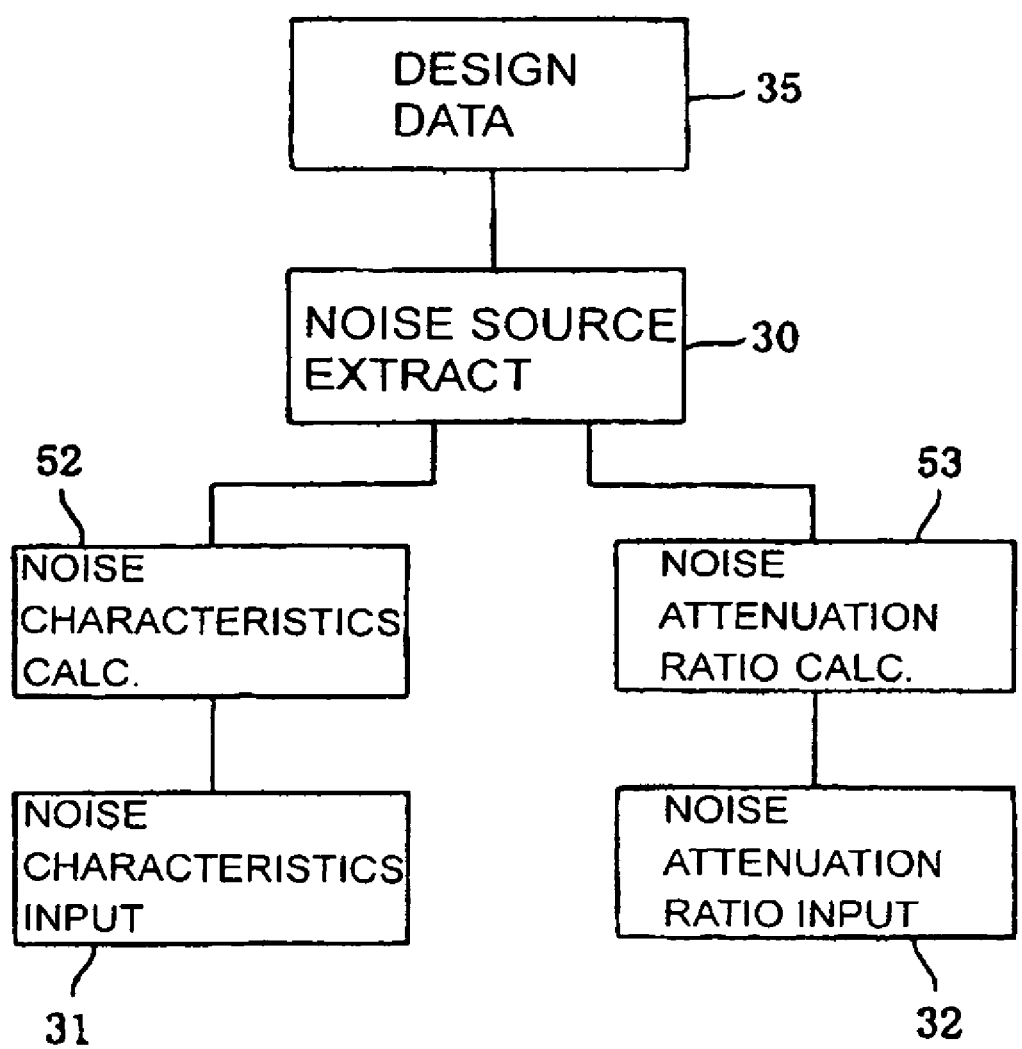
FIG. 10 is a block diagram showing a part of such configuration of the design support system for circuit board, according to the present invention.

FIG. 10 is a block diagram showing a part of such configuration of the design support system for circuit board. A noise characteristics calculation unit 52 calculates noise characteristics of the unwanted radiation noise, which is emitted from the noise source extracted by the noise source extracting unit 30. A noise attenuation ratio calculation unit 53 calculates an attenuation ratio of the unwanted radiation noise which is propagated to the feed point of the antenna.

The noise characteristics can be calculated using simulation analysis with, e.g., SPICE (Simulation Program with Integrated Circuit Emphasis). The noise attenuation ratio can be calculated using simulation analysis with, e.g., electro-magnetic simulator.

The noise characteristics and the noise attenuation ratio, which are calculated by the noise characteristics calculation unit 52 and the noise attenuation ratio calculation unit 53, are supplied to the noise characteristics input unit 31 and the noise attenuation ratio input unit 32, and then the correlation value calculation unit 33, shown in FIG. 2, calculates a correlation value between the noise characteristics and the noise attenuation ratio.

Incidentally, in this embodiment, the correlation value calculation unit 33 may calculate not only the correlation value between the noise characteristics and the noise attenuation ratio, but also another correlation value among the noise characteristics, the noise attenuation ratio and antenna characteristics (e.g., antenna gain, directivity) of the antenna 10. In this case, the design support system 200 for circuit board further includes an antenna characteristics input unit for inputting antenna characteristics of the antenna 10.

According to this embodiment, by calculating the correlation value between the noise characteristics of the unwanted radiation noise and the attenuation ratio of the unwanted radiation noise propagated to the feed point of the antenna, it is easy to identify a disincentive source which may cause the electronic equipment to malfunction due to interference of the unwanted radiation noise into the circuit board via the antenna. Hence, effective measures against the unwanted radiation noise can be taken in a design phase of the circuit board.

Embodiment 2

Figure 11:
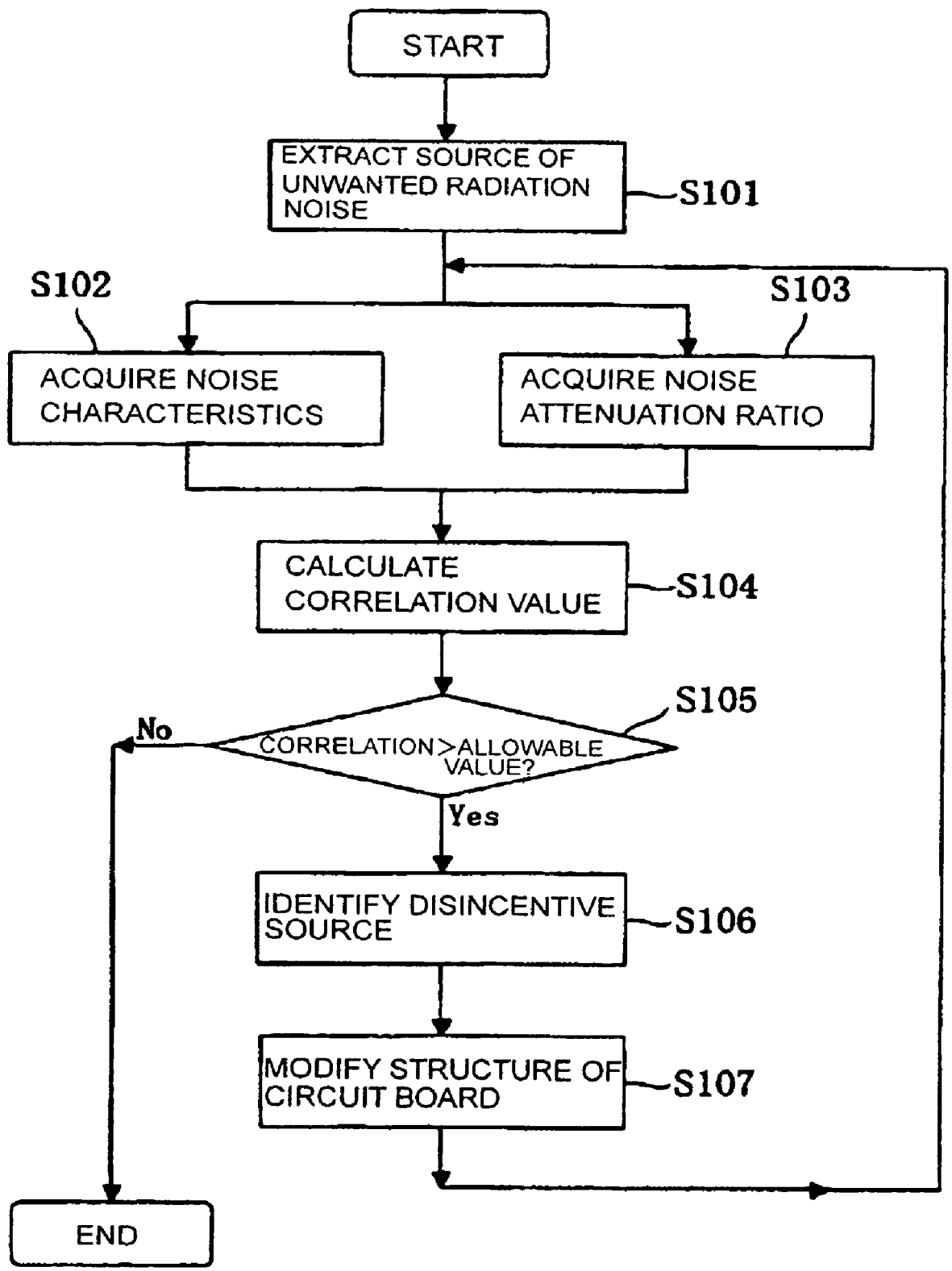
FIG. 11 is a flow chart showing basic steps of a design method for circuit board, according to Embodiment 2 of the present invention.

FIG. 11 is a flow chart showing basic steps of a design method for circuit board, according to Embodiment 2 of the present invention.

First, a source of unwanted radiation noise which is generated from a circuit board mounted on an electronic equipment is extracted (step S101). The source of unwanted radiation noise can be extracted based on design data 35 of the circuit board, in which arrangement of the electronic parts and the wiring pattern are stored.

Next, noise characteristics of the unwanted radiation noise which is emitted by the extracted noise source is acquired (step S102), while an attenuation ratio of the unwanted radiation noise which is emitted by the noise source and propagated to a feed point of the antenna is acquired (step S103).

Next, a correlation value between the noise characteristics (step S102) and the attenuation ratio (step S103) of the unwanted radiation noise is calculated (step S104), and then the calculated correlation value is compared with a predetermined allowable value (step S105).

When the correlation value is larger than the allowable value, a disincentive source which may cause the electronic equipment to malfunction due to interference of the unwanted radiation noise into the circuit board via the antenna is identified (step S106).

After the disincentive noise source against the function of the electronic equipment is identified, structure of the circuit board in which the particular noise source resides is modified (step S107). When modifying structure of the circuit board, such various measures can be taken to suppress EMI, as modification of mounting positions of electronic parts, modification of layout of the wiring pattern, insertion of EMI parts, such as noise filter, and/or insertion of a shielding layer between layers of a multi-layer board.

After structural modification of the circuit board, returning to step S102 and S103, and then steps S104 to S107 are repeated until the correlation value between the noise characteristics and the attenuation ratio of the unwanted radiation noise becomes equal to or smaller than the predetermined allowable value.

The above-mentioned steps S101 to S107 are directed to all the sources of the unwanted radiation noises generated from the circuit board mounted on the electronic equipment.

Further, the noise characteristics of the unwanted radiation noise acquired in step S102 may be substituted with data of high frequency components of a current or a clock waveform (temporal waveform), as well as a radiation spectrum thereof.

Furthermore, the feed point of the antenna is preferably defined as an impedance matching point between the antenna and the RF circuit (receiver circuit).

According to this embodiment, by calculating the correlation value between the noise characteristics of the unwanted radiation noise and the attenuation ratio of the unwanted radiation noise propagated to the feed point of the antenna, it is easy to identify a disincentive source which may cause the electronic equipment to malfunction due to interference of the unwanted radiation noise into the circuit board via the antenna. Hence, effective measures against the unwanted radiation noise can be taken in a design phase of the circuit board to design the circuit board.

Incidentally, a design method for circuit board, according to this embodiment of the present invention, can be performed by executing the analysis program of unwanted radiation noise based on the flow chart shown in FIG. 11.

Figure 12:
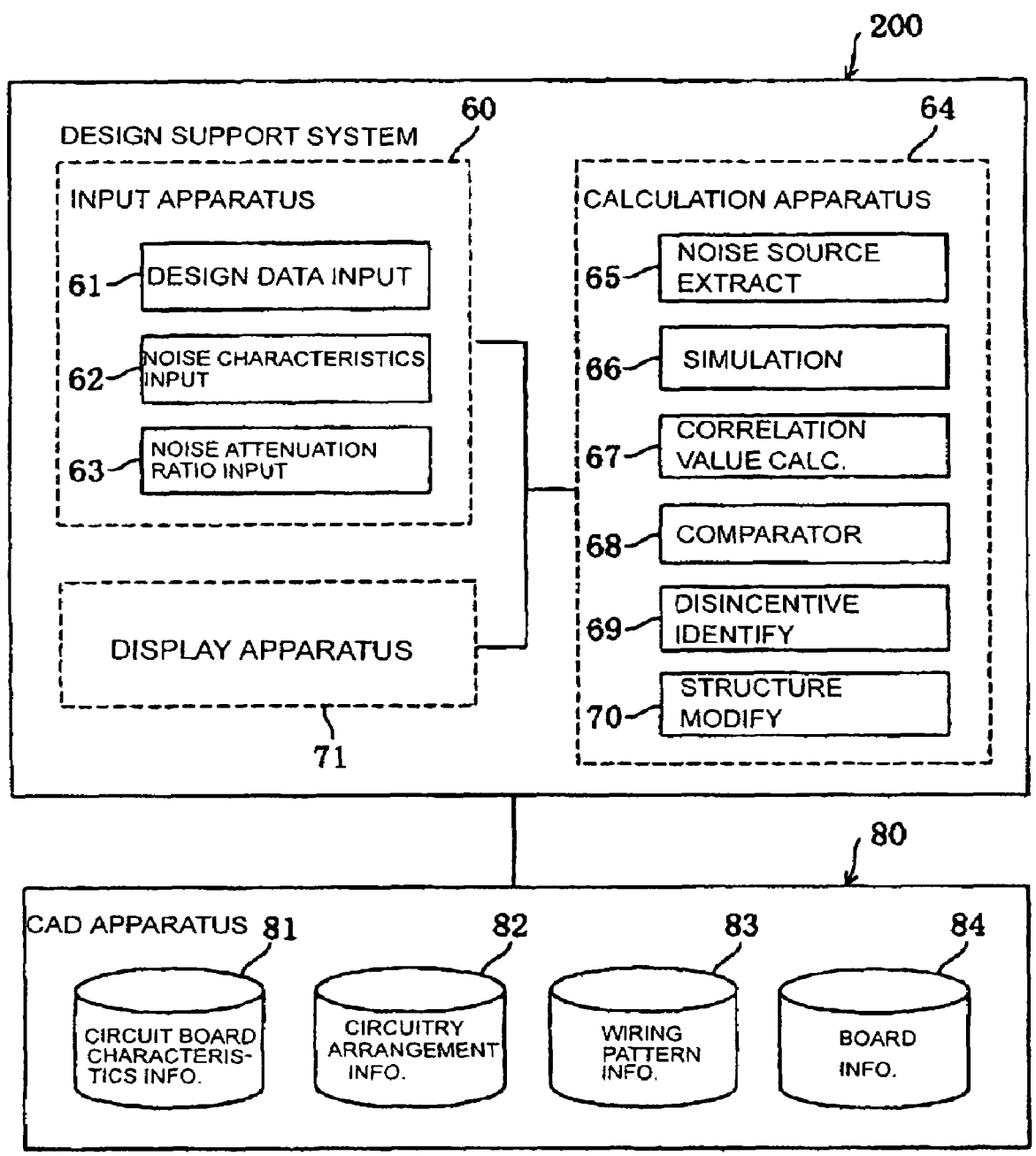
FIG. 12 is a block diagram showing a hardware configuration of a design support system for circuit board, according to the present invention.

FIG. 12 is a block diagram showing a hardware configuration of the design support system 200 for circuit board, according to the present invention. The design method for circuit board and the analysis program of unwanted radiation noise, according to the present invention, can be performed in this hardware configuration.

As shown in FIG. 12, the design support system 200 includes an input apparatus 60, a calculation apparatus 64 and a display apparatus 71.

The input apparatus 60 includes a design data input unit 61, a noise characteristics input unit 62, and a noise attenuation ratio input unit 63. The design data input unit 61 is connected to a CAD apparatus 80 and inputted with required design data of the circuit board among circuit board characteristics information 81, circuitry arrangement information 82, wiring pattern information 83 and board information 84 stored in the CAD apparatus 80.

The noise characteristics input unit 62 is inputted with the noise characteristics of the unwanted radiation noise emitted from the noise source which is extracted by a noise source extracting unit 65 in the calculation apparatus 64. The noise attenuation ratio input unit 63 is inputted with the attenuation ratio of the unwanted radiation noise which is emitted by the noise source, which is extracted by the noise source extracting unit 65, and propagated to the feed point of the antenna.

The calculation apparatus 64 includes the noise source extracting unit 65, a simulation unit 66, a correlation value calculation unit 67, a comparator unit 68, a disincentive identifying unit 69, and a structure modifying unit 70.

The simulation unit 66 calculates the noise characteristics and the attenuation ratio of the unwanted radiation noise using the design data stored in the design data input unit 61. The calculated data are inputted in the noise characteristics input unit 62 and the noise attenuation ratio input unit 63.

The correlation value calculation unit 67 calculates a correlation value between the noise characteristics of the unwanted radiation noise which is inputted in the noise characteristics input unit 62 and the attenuation ratio of the unwanted radiation noise which is inputted in the noise attenuation ratio input unit 63. The comparator unit 68 compares the correlation value calculated by the correlation value calculation unit 67 with a predetermined allowable value.

The disincentive identifying unit 69 identifies, based on the comparative result between the correlation value calculated by the correlation value calculation unit 67 and the predetermined allowable value, a disincentive source which may cause the electronic equipment to malfunction due to interference of the unwanted radiation noise into the circuit board via the antenna.

The structure modifying unit 70 modifies structure of the circuit board in which the source identified by the disincentive identifying unit 69 resides, until the correlation value becomes equal to or smaller than the predetermined allowable value.

Incidentally, the design support system 200 can be constructed in a general purpose device, such as EWS (Engineering Work Station) or PC (Personal Computer) or a dedicated device.

FIGS. 13A and 13B are explanatory views showing a case where measures are taken against unwanted radiation noise by identifying the source thereof disincentive to function of an electronic equipment during design of a circuit board according to the present invention.

FIG. 13A illustrates a case where parts 1 and 2 are arranged on a circuit board, and a wiring pattern 92 connected between the parts 1 and 2 is extracted as a source of unwanted radiation noise.

When the correlation value between the noise characteristics of the unwanted radiation noise which is emitted from the wiring pattern 92 of the noise source and the noise attenuation ratio of the unwanted radiation noise which is propagated to the feed point of the antenna (not shown) exceeds a predetermined allowable value, the particular noise source is identified as a source of the unwanted radiation noise disincentive to function of the electronic equipment.

In this case, as shown in FIG. 13B, the structure of the circuit board in which the noise source resides is be modified until the correlation value is equal to or smaller than the allowable value. FIG. 13*b* shows an example of both the layout of the wiring pattern 92 and the mounting position of the part 1 being modified.

Thus, by modifying the structure of the circuit board, effective measures are taken against the unwanted radiation noise to design the circuit board.

FIGS. 14A and 14B are schematic views showing the antenna 10 and the RF circuit (receiver circuit) in the cellular phone 100. In FIG. 14A, the antenna 10 is arranged outside of the chassis of the cellular phone 100, whereas, in FIG. 14B, the antenna 10 is arranged inside of the chassis of the cellular phone 100 (portion of the circuit board).

The present invention can solve a different type of noise problem in which a slight unwanted radiation noise generated from the particular electronic equipment may be picked up by a highly-sensitive antenna thereof, causing the electronic equipment to malfunction. In particular, the present invention can be effectively applied to such a case where an antenna is built inside a chassis of a cellular phone as shown in FIG. 14B.

Although the present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A noise analysis program for unwanted radiation noises of an electronic equipment which can transmit and receive electro-magnetic waves via an antenna, comprising:
    a first step for extracting a source of unwanted radiation noise which is generated from a circuit board mounted on the electronic equipment;
    a second step for acquiring noise characteristics of the unwanted radiation noise which is emitted by the extracted noise source;
    a third step for acquiring an attenuation ratio of the unwanted radiation noise which is emitted by the noise source and propagated to a feed point of the antenna;
    a fourth step for calculating a correlation value between the noise characteristics and the attenuation ratio of the unwanted radiation noise; and
    a fifth step unit for identifying, based on a comparative result between the calculated correlation value and the predetermined allowable value, a disincentive source which may cause the electronic equipment to malfunction due to interference of the unwanted radiation noise into the circuit board via the antenna.

2. The noise analysis program according to claim 1, wherein said fifth step identifies a disincentive source which may disable reception characteristics of a receiver circuit on the circuit board due to interference of the unwanted radiation noise into the receiver circuit via the antenna.

3. The noise analysis program according to claim 1, wherein the noise characteristics include a radiation spectrum of the unwanted radiation noise.

4. A design method for circuit board of an electronic equipment which can transmit and receive electro-magnetic waves via an antenna comprising:
    a first step for extracting a source of unwanted radiation noise which is generated from the circuit board mounted on the electronic equipment;
    a second step for acquiring noise characteristics of the unwanted radiation noise which is emitted by the extracted noise source;
    a third step for acquiring an attenuation ratio of the unwanted radiation noise which is emitted by the noise source and propagated to a feed point of the antenna;
    a fourth step for calculating a correlation value between the noise characteristics and the attenuation ratio of the unwanted radiation noise; and
    a fifth step unit for identifying, based on a comparative result between the calculated correlation value and a predetermined allowable value, a disincentive source which may cause the electronic equipment to malfunction due to interference of the unwanted radiation noise into the circuit board via the antenna.

5. A design method according to claim 4, wherein said fifth step identifies a disincentive source which may disable reception characteristics of a receiver circuit on the circuit board due to interference of the unwanted radiation noise into the receiver circuit via the antenna.

6. The design method according to claim 4, wherein the noise characteristics include a radiation spectrum of the unwanted radiation noise.

7. The design method according to claim 4, further comprising:
    a sixth step for modifying structure of the circuit board in which the identified source resides, until the correlation value becomes equal to or smaller than the predetermined allowable value.

8. The design method according to claim 7, wherein said sixth step modifies either mounting position of electronic parts or a wiring pattern, until the correlation value becomes equal to or smaller than the predetermined allowable value.

9. A design support system for circuit board of an electronic equipment which can transmit and receive electromagnetic waves via an antenna, comprising:
- a noise source extracting unit for extracting a source of unwanted radiation noise which is generated from the circuit board mounted on the electronic equipment;
- a noise characteristics input unit for inputting noise characteristics of the unwanted radiation noise which is emitted by the extracted noise source;
- a noise attenuation ratio input unit for inputting an attenuation ratio of the unwanted radiation noise which is emitted by the noise source and propagated to a feed point of the antenna;
- a correlation value calculation unit for calculating a correlation value between the noise characteristics and the attenuation ratio of the unwanted radiation noise; and
- a comparator unit for comparing the calculated correlation value with a predetermined allowable value.

10. The design support system according to claim 9, further comprising:
- a disincentive identifying unit for identifying, based on the comparative result between the correlation value calculated by the correlation value calculation unit and the predetermined allowable value, a disincentive source which may cause the electronic equipment to malfunction due to interference of the unwanted radiation noise into the circuit board via the antenna.

11. The design support system according to claim 10, wherein said disincentive identifying unit identifies a disincentive source which may disable reception characteristics of a receiver circuit on the circuit board due to interference of the unwanted radiation noise into the receiver circuit via the antenna.

12. The design support system according to claim 11, wherein said feed point of the antenna is defined as an impedance matching point between the antenna and the receiver circuit.

13. The design support system according to claim 9, wherein the noise characteristics include a radiation spectrum of the unwanted radiation noise.

14. The design support system according to claim 9, wherein the antenna is formed of a part of the circuit board.

15. The design support system according to claim 9, further comprising:
- a structure modifying unit for modifying structure of the circuit board in which the source identified by the disincentive identifying unit resides, until the correlation value becomes equal to or smaller than the predetermined allowable value.

16. The design support system according to claim 15, wherein modification of structure of the circuit board includes modification of either mounting position of electronic parts or a wiring pattern.

17. The design support system according to claim 9, further comprising:
- a design data unit in which design data of the circuit board are stored; and
- a noise characteristics calculation unit for calculating noise characteristics of the unwanted radiation noise using simulation, based on the design data stored in the design data unit.

18. The design support system according to claim 9, further comprising:
- a design data unit in which design data of the circuit board are stored; and
- a noise attenuation ratio calculation unit for calculating the attenuation ratio of the unwanted radiation noise which is propagated to the feed point of the antenna, based on the design data stored in the design data unit.

19. The design support system according to claim 9, further comprising:
- an antenna characteristics input unit for inputting antenna characteristics of the antenna,
- wherein the correlation value calculation unit calculates the noise characteristics and the attenuation ratio of the unwanted radiation noise, and a correlation value of the antenna characteristics.

* * * * *